(12) United States Patent
Kamenoue et al.

(10) Patent No.: US 11,345,764 B2
(45) Date of Patent: May 31, 2022

(54) REACTIVE SURFACTANT COMPOSITION FOR EMULSION POLYMERIZATION

(71) Applicant: KAO CORPORATION, Tokyo (JP)

(72) Inventors: Shogo Kamenoue, Wakayama (JP); Takayuki Ikenaga, Wakayama (JP); Atsuhito Mori, Wakayama (JP)

(73) Assignee: KAO CORPORATION, Tokyo (JP)

( * ) Notice: Subject to any disclaimer, the term of this patent is extended or adjusted under 35 U.S.C. 154(b) by 60 days.

(21) Appl. No.: 16/923,186

(22) Filed: Jul. 8, 2020

(65) Prior Publication Data

US 2020/0339711 A1  Oct. 29, 2020

Related U.S. Application Data

(62) Division of application No. 15/766,330, filed as application No. PCT/JP2016/079204 on Oct. 3, 2016, now abandoned.

(30) Foreign Application Priority Data

Oct. 9, 2015   (JP) ................................ 2015-201128

(51) Int. Cl.
  *B01J 21/02* (2006.01)
  *B01J 21/10* (2006.01)
  (Continued)

(52) U.S. Cl.
  CPC .................. *C08F 2/26* (2013.01); *C08F 2/24* (2013.01); *C08F 116/12* (2013.01);
  (Continued)

(58) Field of Classification Search
  None
  See application file for complete search history.

(56) References Cited

U.S. PATENT DOCUMENTS 4,375,564 A  *  3/1983  Edwards ................. C07C 41/03
                                                      568/618
5,750,796 A      5/1998  Hama et al.
(Continued)

FOREIGN PATENT DOCUMENTS

CN       101559361 A    10/2009
JP       61-223011 A    10/1986
(Continued)

OTHER PUBLICATIONS

European Patent Office Communication with an extended search report issued in the corresponding European Patent Application No. 16853499.8 dated Apr. 17, 2019.
(Continued)

*Primary Examiner* — Richard A Huhn
(74) *Attorney, Agent, or Firm* — Birch, Stewart, Kolasch & Birch, LLP

(57) ABSTRACT

The present invention is concerned with a reactive surfactant composition for emulsion polymerization, which is able to micronize the particle diameter of a polymer emulsion and to reduce the addition amount of the reactive surfactant composition to be used. The reactive surfactant composition for emulsion polymerization of the present invention contains a reactive anionic surfactant (component A) represented by the following formula (I):

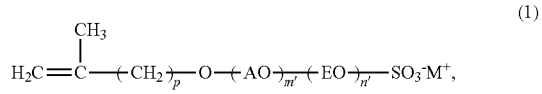

wherein AO represents an alkyleneoxy group having a carbon number of 3 or more and 18 or less; EO represents
(Continued)

an ethyleneoxy group; p represents an integer of 1 or more and 15 or less; m' represents an integer of 0 or more; n' represents an integer of 0 or more; $M^+$ represents a hydrogen ion or a cation; and plural kinds of AOs may coexist.

20 Claims, 1 Drawing Sheet

(51) Int. Cl.

| | | |
|---|---|---|
| *C08G 65/04* | (2006.01) | |
| *C08F 2/26* | (2006.01) | |
| *C08F 290/06* | (2006.01) | |
| *C09D 157/04* | (2006.01) | |
| *C08F 220/16* | (2006.01) | |
| *C08F 2/24* | (2006.01) | |
| *C09D 5/02* | (2006.01) | |
| *C08F 116/12* | (2006.01) | |
| *C08F 128/02* | (2006.01) | |
| *C08G 65/26* | (2006.01) | |

(52) U.S. Cl.
CPC .......... *C08F 128/02* (2013.01); *C08F 220/16* (2013.01); *C08F 290/06* (2013.01); *C09D 5/02* (2013.01); *C09D 5/022* (2013.01); *C09D 157/04* (2013.01); *B01J 21/02* (2013.01); *B01J 21/10* (2013.01); *C08F 2500/02* (2013.01); *C08F 2800/20* (2013.01); *C08G 65/04* (2013.01); *C08G 65/2609* (2013.01); *C08G 65/2651* (2013.01); *C08G 65/2654* (2013.01)

(56) References Cited

U.S. PATENT DOCUMENTS

| | | | | |
|---|---|---|---|---|
| 6,504,061 B1 * | 1/2003 | Okamoto | ................ | B01J 23/26 |
| | | | | 568/618 |
| 9,828,321 B2 * | 11/2017 | Narasimhan | ............. | C11D 1/72 |
| 2004/0048963 A1 * | 3/2004 | Sawada | ..................... | C08F 2/26 |
| | | | | 524/423 |

FOREIGN PATENT DOCUMENTS

| | | | | | |
|---|---|---|---|---|---|
| JP | | 10137592 A | * | 5/1998 | |
| JP | | 8-268919 A | | 10/1998 | |
| JP | | 2000-15094 A | | 1/2000 | |
| JP | | 2000-16958 A | | 1/2000 | |
| JP | | 2000-354763 A | | 12/2000 | |
| JP | | 2001-261816 A | | 9/2001 | |
| JP | | 2002-80506 A | | 3/2002 | |
| JP | | 2002-88104 A | | 3/2002 | |
| JP | | 2002-302544 A | | 10/2002 | |
| JP | | 2003-261605 A | | 9/2003 | |
| WO | | WO-9308149 A1 | * | 4/1993 | .......... C07C 51/412 |
| WO | | WO 2015/093275 A1 | | 6/2015 | |

OTHER PUBLICATIONS

International Search Report for PCT/JP2016/079204 (PCT/ISA/210) dated Dec. 27, 2016.

* cited by examiner

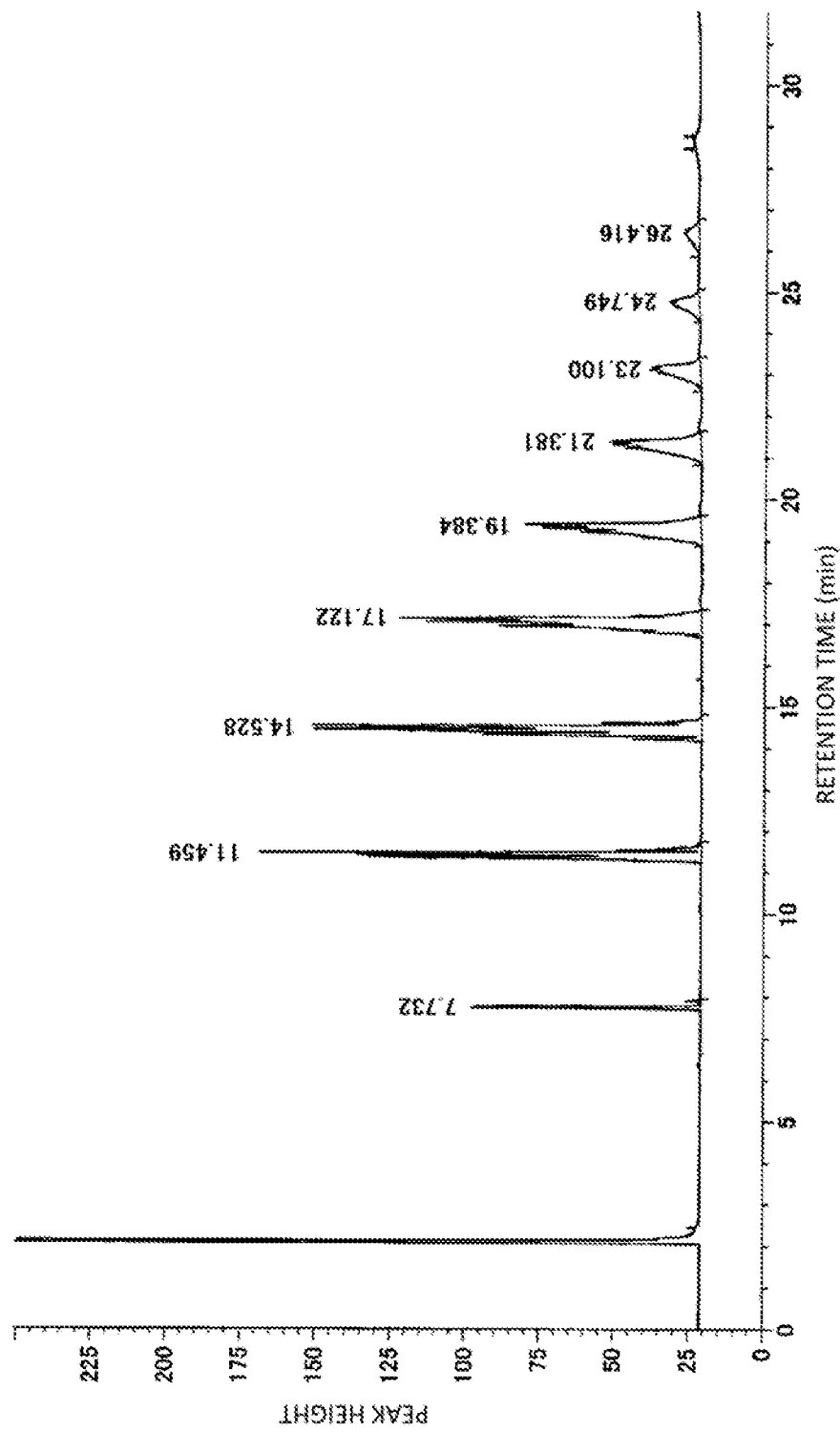

REACTIVE SURFACTANT COMPOSITION FOR EMULSION POLYMERIZATION

CROSS-REFERENCE TO RELATED APPLICATION

This application is a Divisional application of co-pending application Ser. No. 15/766,330, filed on Apr. 5, 2018, which is the National Phase under 35 U.S.C. § 371 of International Application No. PCT/JP2016/079204, filed on Oct. 3, 2016, which claims the benefit under 35 U.S.C. § 119(a) to Patent Application No. 2015-201128, filed in Japan on Oct. 9, 2015, all of which are hereby expressly incorporated by reference into the present application.

FIELD OF THE INVENTION

The present invention relates to a reactive surfactant composition for emulsion polymerization, a production method of a polymer emulsion using the same, a polymer emulsion produced by this production method, a coating material composition containing this polymer emulsion, a polymer coating film formed using this coating material composition, a production method of a reactive anionic surfactant, and use of the reactive surfactant composition for emulsion polymerization.

BACKGROUND OF THE INVENTION

An emulsifier in emulsion polymerization not only influences initiation reaction of polymerization and growth reaction but also influences stability of a polymer emulsion during the polymerization as well as mechanical stability, chemical stability, freeze stability, and storage stability of the formed polymer emulsion. In addition, the emulsifier has much influence on emulsion physical properties, such as particle diameter, viscosity, foamability, etc., of the polymer emulsion, and when forming into a film, on film physical properties, such as water resistance, humidity resistance, heat resistance, adhesiveness, pressure sensitive adhesion, etc.

In applications of a coating material, an adhesive, and so on, a polymer coating film is formed through drying of a polymer emulsion; however, it is known that the emulsifier remaining in the polymer coating film causes lowering in water resistance, adhesiveness, weather resistance, heat resistance, and so on. For example, for an aqueous coating material, a polymer emulsion resulting from emulsion polymerization of a (meth)acrylic acid ester is frequently used. However, in the case where the water resistance of this polymer coating material is poor, such a polymer emulsion cannot be used for an application in which the water resistance is required, such as a building outer wall, a bathroom wall, etc. In addition, in production of a synthetic rubber or the like, on taking out the polymer from the polymer emulsion by means of salting-out or the like, there is involved such a problem that the emulsifier is contained in drainage, whereby a burden of the waste water treatment becomes large.

In order to solve such defects, there is proposed a method of using a so-called reactive surfactant having an ethylenically unsaturated bond as a polymerizable group in the molecule.

For example, JP 2002-80506 A (PTL 1) and JP 2002-88104 A (PTL 2) describe a reactive surfactant composition containing an unsaturated compound and a production method of a polymer emulsion in which emulsion polymerization is performed using this reactive surfactant composition; and JP 2003-261605 A (PTL 3) describes a reactive surfactant, a production method of a polymer emulsion in which emulsion polymerization is performed using this, a polymer emulsion with good water resistance as produced, and a polymer coating film prepared using this.

SUMMARY OF THE INVENTION

The present invention is concerned with the following [1] to [7].

[1] A reactive surfactant composition for emulsion polymerization containing a reactive anionic surfactant (component A) represented by the following formula (1), the component A being satisfied with the following requirement R:

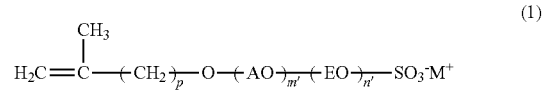
(1)

wherein AO represents an alkyleneoxy group having a carbon number of 3 or more and 18 or less; EO represents an ethyleneoxy group; p represents an integer of 1 or more and 15 or less; m+ represents an integer of 0 or more; n' represents an integer of 0 or more; $M^+$ represents a hydrogen ion or a cation; and plural kinds of AOs may coexist.

Requirement R: An average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{(\text{molar number of component } A\text{-}1)+(\text{molar number of component } A\text{-}2)\} \div (\text{molar number of component } A) \times 100$      (I)

[2] A method of producing a polymer emulsion, including subjecting a radical polymerizable monomer to emulsion polymerization in the presence of the reactive surfactant composition for emulsion polymerization as set forth in the above [1].

[3] A polymer emulsion obtained by the production method as set forth in the above [2].

[4] A coating material composition containing the polymer emulsion as set forth in the above [3].

[5] A polymer coating film formed of the coating material composition as set forth in the above [4].

[6] A method of producing a reactive anionic surfactant, including the following steps (i) to (iii), the reactive anionic surfactant being represented by the following formula (1) and being satisfied with the following requirement R (provided that in the requirement R, when n is 0, then the step (ii) is not performed):

Step (i): a step of adding an alkylene oxide having a carbon number of 3 or more and 18 or less to a compound represented by the following formula (2) in the presence of an aluminum-magnesium complex oxide catalyst to thereby obtain a compound represented by the following formula (3);

Step (ii): a step of adding ethylene oxide to the compound represented by the following formula (3) in the presence of an alkali catalyst to thereby obtain a compound represented by the following formula (4); and Step (iii): a step of sulfating the compound represented by the following formula (4) with a sulfating agent and neutralizing with a basic substance,

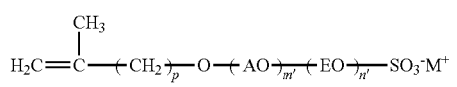

(1)

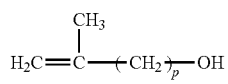

(2)

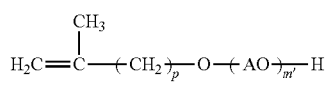

(3)

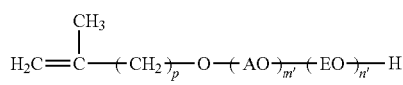

(4)

wherein AO represents an alkyleneoxy group having a carbon number of 3 or more and 18 or less; E represents an ethyleneoxy group; p represents an integer of 1 or more and 15 or less; m' represents an integer of 0 or more; n' represents an integer of 0 or more; M⁺ represents a hydrogen ion or a cation; and plural kinds of AOs may coexist.

Requirement R: an average addition molar number m of AO is a number of 1 or more and 50 or less; an average addition molar number n of EO is a number of 0 or more and 200 or less; and when in the compound represented by the formula (1) (component A), a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{(\text{molar number of component}A\text{-}1)+(\text{molar number of component}A\text{-}2)\}\div(\text{molar number of component}A)\times 100$ (I)

[7] Use of a reactive surfactant composition containing a reactive anionic surfactant (component A) represented by the following formula (1), the component A being satisfied with the following requirement R, for emulsion polymerization:

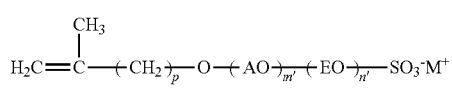

(1)

wherein AO represents an alkyleneoxy group having a carbon number of 3 or more and 18 or less; EO represents an ethyleneoxy group; p represents an integer of 1 or more and 15 or less; m' represents an integer of 0 or more; n' represents an integer of 0 or more; M⁺ represents a hydrogen ion or a cation; and plural kinds of AOs may coexist.

Requirement R: an average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1):

$X=\{(\text{molar number of component}A\text{-}1)+(\text{molar number of component}A\text{-}2)\}\div(\text{molar number of component}A)\times 100$ (I)

BRIEF DESCRIPTION OF THE DRAWING

The FIGURE is a chromatogram chart of a compound represented by the formula (3) as produced in Production Example 1 of the Examples.

DETAILED DESCRIPTION OF THE INVENTION

In the reactive surfactants described in PTLs 1 to 3, the distribution of the alkylene oxide addition molar number in the polyalkylene oxide unit is broad, and therefore, one with excessively high hydrophobicity and one with excessively high hydrophilicity are coexistent. Accordingly, on performing the emulsion polymerization, a surfactant with an insufficient surface active performance is existent, and therefore, there is involved such a problem that the particle diameter of the obtained polymer emulsion is large, and on forming a polymer coating film, the water resistance is worsened. In addition, for the purpose of micronizing the particle diameter of the polymer emulsion to obtain the water resistance on forming a polymer coating film, in the emulsion polymerization, it is necessary to make the reactive surfactant thoroughly function, and in the case where one with excessively high hydrophobicity and one with excessively high hydrophilicity are coexistent, it was necessary to use the reactive surfactant in a high concentration.

The present invention is concerned with a reactive surfactant composition for emulsion polymerization, which is able to micronize the particle diameter of a polymer emulsion and to reduce the addition amount of the reactive surfactant composition to be used; a production method of a polymer emulsion using this reactive surfactant composition for emulsion polymerization; a polymer emulsion produced by this production method; a coating material composition containing this polymer emulsion; a polymer coating film with excellent water resistance, which is formed of this coating material composition; a production method of a reactive anionic surfactant; and use of a reactive surfactant composition for emulsion polymerization.

The present inventors have found that the aforementioned problem can be solved by using a specified reactive surfactant composition for emulsion polymerization.

In accordance with the present invention, it is possible to provide a reactive surfactant composition for emulsion polymerization, which is able to micronize the particle diameter of a polymer emulsion and to reduce the addition amount of the reactive surfactant composition to be used; a production method of a polymer emulsion using this reactive surfactant composition for emulsion polymerization; a polymer emulsion produced by this production method; a coating material composition containing this polymer emulsion; a polymer coating film with excellent water resistance, which is formed of this coating material composition; a production method of a reactive anionic surfactant; and use of a reactive surfactant composition for emulsion polymerization.

[Reactive Surfactant Composition for Emulsion Polymerization, and Use of Reactive Surfactant for Emulsion Polymerization]

The reactive surfactant composition for emulsion polymerization of the present invention (hereinafter also referred to simply as "reactive surfactant composition") contains a reactive anionic surfactant (component A) represented by the following formula (1) and is satisfied with the following requirement R. The component A is an agglomeration of plural compounds having a distribution in the number of m' and/or n', each being different in the number of m' and/or n'. Then, in the present invention, though the term "composition" is used, it may also be a composition substantially composed of only the component A.

It is suitable that the reactive surfactant composition of the present invention is used for emulsion polymerization.

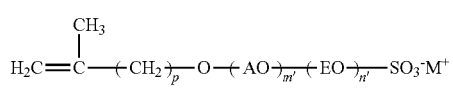
(1)

In the formula, AO represents an alkyleneoxy group having a carbon number of 3 or more and 18 or less; EO represents an ethyleneoxy group; p represents an integer of 1 or more and 15 or less; m' represents an integer of 0 or more; n' represents an integer of 0 or more; $M^+$ represents a hydrogen ion or a cation; and plural kinds of AOs may coexist.

Requirement R: An average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{$(molar number of componentA-1)+(molar number of componentA-2)$\}$÷(molar number of componentA)×100    (I)

The reactive anionic surfactant (hereinafter also referred to as "surfactant of the present invention" or "reactive surfactant of the present invention") which is represented by the aforementioned formula (1) and is satisfied with the requirement R is hereunder described.

In the aforementioned formula (1), the alkyleneoxy group represented by AO has a carbon number of 3 or more and 18 or less. From the viewpoints of micronization of the polymer emulsion particle diameter and water resistance of the coating film, the carbon number of the alkyleneoxy group is preferably 12 or less, more preferably 8 or less, still more preferably 6 or less, and yet still more preferably 4. The alkylene group in the alkyleneoxy group may be either branched or linear.

Specific examples of AO include a propyleneoxy group, a butyleneoxy group, a pentyleneoxy group, a hexyleneoxy group, an octyleneoxy group, a 2-ethylhexyleneoxy group, a nonyleneoxy group, a decyleneoxy group, an undecyleneoxy group, a dodecyleneoxy group, a tetradecyleneoxy group, a hexadecyleneoxy group, an octadecyleneoxy group, and the like, with a butyleneoxy group being preferred.

In the formula (1), AO may be a single kind, or plural kinds of AOs may coexist.

A small amount of an ethyleneoxy group may be contained as AO within a range where the effects of the present invention are not impaired, and such an embodiment is included in the present invention, too.

p represents the methylene group number and is an integer of 1 or more and 15 or less. From the viewpoint of micronizing the particle diameter at the time of emulsion polymerization, p is preferably 10 or less, more preferably 5 or less, still more preferably 3 or less, and yet still more preferably 2.

m' represents an addition molar number of the alkyleneoxy group represented by AO and is an integer of 0 or more. From the viewpoint of micronizing the particle diameter at the time of emulsion polymerization, m' is preferably an integer of 1 or more, more preferably an integer of 2 or more, and still more preferably an integer of 3 or more; and from the same viewpoint, m' is preferably an integer of 100 or less, more preferably an integer of 50 or less, still more preferably an integer of 30 or less, and yet still more preferably an integer of 15 or less.

n' represents an addition molar number of the ethyleneoxy group represented by EO and is an integer of 0 or more. From the viewpoint of micronizing the particle diameter at the time of emulsion polymerization, n' is preferably an integer of 1 or more, more preferably an integer of 2 or more, and still more preferably an integer of 5 or more; and from the same viewpoint, n' is preferably an integer of 400 or less, more preferably an integer of 200 or less, still more preferably an integer of 100 or less, and yet still more preferably an integer of 50 or less.

$M^+$ represents a hydrogen ion ($H^+$) or a cation. Examples of the cation include an alkali metal ion, such as a sodium ion ($Na^+$), a potassium ion ($K^+$), etc.; an alkaline earth metal ion, such as a calcium ion ($Ca^{2+}$), a magnesium ion ($Mg^{2+}$), etc.; an ammonium ion ($NH_4^+$); an ammonium ion substituted with an alkyl group having a carbon number of 1 to 4; and the like, with an ammonium ion ($NH_4^+$) being preferred. In the case where $M^+$ is a divalent or higher valent cation, such a cation may exist so as to become a counter ion to the anion of $—SO_3^-$, and for example, so far as a divalent cation is concerned, it may exist in an amount of ½ of the amount of $—SO_3^-$.

In the present invention, the component A is satisfied with the following requirement R.

Requirement R: An average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{$(molar number of componentA-1)+(molar number of componentA-2)$\}$÷(molar number of componentA)×100    (I)

m is an average addition molar number of the alkyleneoxy group represented by AO and is a number of 1 or more and 50 or less. From the viewpoint of micronizing the particle diameter at the time of emulsion polymerization, m is preferably 2 or more, more preferably 3 or more, and still more preferably 4 or more; and from the same viewpoint, m is preferably 20 or less, more preferably 10 or less, and still more preferably 8 or less.

n is an average addition molar number of the ethyleneoxy group represented by EO and is a number of 0 or more and 200 or less. From the viewpoint of micronizing the particle diameter at the time of emulsion polymerization, n is preferably 1 or more, more preferably 5 or more, still more preferably 10 or more, and yet still more preferably 12 or more; and from the same viewpoint, n is preferably 150 or less, more preferably 50 or less, still more preferably 25 or less, and yet still more preferably 18 or less.

(m+n) is in a range of 1≤(m+n)≤250). From the viewpoint of micronizing the particle diameter at the time of emulsion polymerization, (m+n) is preferably {3≤(m+n)≤100}, more preferably {5≤(m+n)≤50}, still more preferably {10≤(m+n)≤35}, yet still more preferably {15≤(m+n)≤30}, even yet still more preferably {16≤(m+n)≤26}, and even still more preferably {18≤(m+n)≤25}.

In the reactive surfactant of the present invention, when in the component A, a component having an AO addition molar number of (m−3) or less is defined as (component A-1), and a component having an AO addition molar number of (m+2) or more is defined as (component A-2), X in the following formula (I) is less than 30, provided that when m is less than 3, (m'=0) is defined as (component A-1).

X={(molar number of componentA-1)+(molar number of componentA-2)}÷(molar number of componentA)×100    (I)

In the component A, the component having an AO addition molar number of (m−3) or less means a component in which an integer is determined by rounding off the first decimal place of (m−3), and the AO addition molar number in the component A is the foregoing integer or less. In consequence, for example, in the case where m is 4.2, the component having an AO addition molar number of (m−3) or less means a component having an AO addition molar number of 1 or less. The same is also applicable to the component in which the AO addition molar number in the component A is (m+2) or more.

When X is less than 30, the polymer emulsion may be micronized in the particle diameter.

X is preferably 29 or less, more preferably 28 or less, and still more preferably 27 or less. Though a lower limit of X is not particularly limited, from the viewpoint of synthesis, X is preferably 10 or more, more preferably 15 or more, and still more preferably 20 or more.

<Synthesis Method of Reactive Anionic Surfactant of the Present Invention>

It is preferred that a compound represented by the following formula (3) that is an intermediate of the reactive anionic surfactant represented by the aforementioned formula (1) is synthesized by a method of adding an alkylene oxide having a carbon number of 3 or more and 18 or less to a compound represented by the following formula (2) in the presence of a catalyst composed of a complex oxide of aluminum and magnesium (hereinafter also referred to as "aluminum-magnesium complex oxide catalyst").

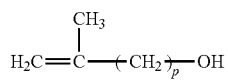

(2)

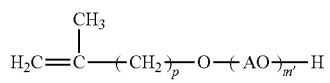

(3)

In the formulae, p and m' are the same as in the formula (1), and preferred ranges thereof are also the same.

The preferred catalyst which is used for alkyleneoxy group addition polymerization of the reactive surfactant of the present invention is an aluminum-magnesium complex oxide catalyst (hereinafter also referred to as "Al—Mg complex oxide catalyst") which is activated through calcination of aluminum hydroxide-magnesium (also expressed as "aluminum hydroxide-magnesium hydroxide coprecipitate"). The content of aluminum of the Al—Mg complex oxide catalyst is preferably 4% by mass or more, and more preferably 10% by mass or more, and preferably 40% by mass or less, and more preferably 25% by mass or less. In addition, the content of magnesium is preferably 5% by mass or more, and more preferably 10% by mass or more, and preferably 50% by mass or less, and more preferably 40% by mass or less.

Examples of a commercially available product of the aforementioned Al—Mg complex oxide catalyst include "KW-2000" (aluminum content: 17.5% by mass, magnesium content: 35.4% by mass, manufactured by Kyowa Chemical Industry Co., Ltd.), "KYOWAAD 300S" (aluminum content: 14% by mass, magnesium content: 16% by mass, manufactured by Kyowa Chemical Industry Co., Ltd.), and "KYOWAAD 1000" (aluminum content: 10% by mass, magnesium content: 21% by mass, manufactured by Kyowa Chemical Industry Co., Ltd.), with "KW-2000" being preferred.

From the viewpoint of obtaining a high catalytic ability, a calcination temperature of the aluminum hydroxide-magnesium is preferably 200° C. or higher, and more preferably 300° C. or higher, and preferably 1,000° C. or lower, and more preferably 800° C. or lower. In order to prevent adsorption of water or carbon dioxide from occurring, though it is preferred that the catalyst after the calcination is cooled in an inert gas or in vacuo, and after cooling, the resulting catalyst is dipped in an active hydrogen-containing organic compound to be used for the reaction or stored in a vacuum desiccator, the catalyst resulting from coming into contact with air to adsorb water or carbon dioxide thereon may also be used for the reaction.

As a reaction operation, there is exemplified a method in which starting raw materials, such as the compound represented by the formula (2), etc., and the Al—Mg complex oxide catalyst are charged in a reaction vessel, and the alkylene oxide is introduced at a predetermined temperature in a nitrogen atmosphere while being dropped under reflux, to achieve the reaction. From the viewpoint of reaction rate, a reaction temperature is preferably 70° C. or higher, more preferably 80° C. or higher, and still more preferably 90° C. or higher; and from the same viewpoint, the reaction temperature is preferably 200° C. or lower, more preferably 150° C. or lower, and still more preferably 130° C. or lower.

Though the use amount of the catalyst varies with a molar ratio between the alkylene oxide and the staring raw materials, such as the compound represented by the formula (2), etc., both of which are provided for the reaction, from the viewpoints of reaction rate and easiness in catalyst removal, the use amount of the catalyst is preferably 0.05% by mass or more, more preferably 0.1% by mass or more, still more preferably 0.5% by mass or more, and yet still more preferably 1% by mass or more relative to the compound represented by the formula (2). From the same viewpoints, the use amount of the catalyst is preferably 20% by mass or less, and more preferably 10% by mass or less.

It is also possible to perform the reaction operation in an autoclave. The reaction may also be performed in such a manner that the starting raw materials, such as the compound represented by the formula (2), etc., and the Al—Mg complex oxide catalyst are charged, and after purging with nitrogen, the alkylene oxide is introduced under predetermined temperature-pressure conditions.

Though a method of catalyst separation is not particularly limited, there may be considered a method in which after the reaction, the reaction product is cooled, and for example, water or a filter aid (e.g., diatomaceous earth, a cellulose-based aid, activated clay, etc.) for the purpose of reducing the viscosity is added, followed by filtration of the catalyst.

In order to obtain the component A in which X of the formula (I) is less than 30, as mentioned above, in the AO addition reaction, it is preferred to use the Al—Mg complex oxide catalyst, but such is not limited to the foregoing method. As another method, there is exemplified a method in which the compound represented by the formula (3) having a broad distribution of the added polyalkyleneoxy group number is subjected to distillation or preparative chromatography to remove one having a small alkyleneoxy group (AO) addition molar number and one having a large AO addition molar number, thereby obtaining the compound represented by the formula (3) having a narrow distribution of the AO addition molar number.

In order to regulate the average addition molar number m of AO to a number of 1 or more and 50 or less, the reaction amounts of the compound represented by the formula (2) and the alkylene oxide may be properly regulated.

The compound represented by the formula (4) that is an intermediate of the reactive surfactant of the present invention may be synthesized by a known method. For example, the compound represented by the formula (4) may be synthesized by a method in which ethylene oxide is added to the compound represented by the aforementioned formula (3) in the presence of an alkali catalyst, such as sodium hydroxide, potassium hydroxide, etc., at atmospheric pressure or under an elevated pressure at a temperature of room temperature or higher and 200° C. or lower.

From the viewpoint of reactivity, the pressure is preferably 0.1 MPa or more, and more preferably 0.15 MPa or more; and from the same viewpoint, the pressure is preferably 3 MPa or less, and more preferably 1 MPa or less. In addition, from the viewpoint of reactivity, the reaction temperature is preferably room temperature or higher, more preferably 60° C. or higher, and still more preferably 100° C. or higher; and from the same viewpoint, the reaction temperature is preferably 200° C. or lower, more preferably 170° C. or lower, and still more preferably 150° C. or lower.

The addition of ethylene oxide is arbitrary, and in the case where n is 0 in the formula (1), the subject step may not be performed.

In order to regulate the average addition molar number n of EO to a number of 1 or more and 50 or less, the reaction amounts of the compound represented by the formula (3) and ethylene oxide may be properly regulated.

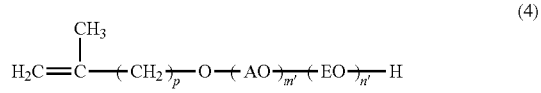

(4)

In the formula, p, m', and n' are the same as in the formula (1), and preferred ranges thereof are also the same.

The reactive anionic surfactant represented by the aforementioned formula (1) is obtained by sulfating the compound represented by the formula (4) with a sulfating agent and neutralizing with a basic substance. Examples of the sulfating agent include chlorosulfonic acid, sulfuric anhydride, and amidosulfuric acid. From the viewpoint of minimizing a side reaction, such as an addition reaction of a sulfate group to the double bond group, isomerization of the double bond group, etc., use of amidosulfuric acid is preferred.

On obtaining the compound represented by the aforementioned formula (1) through sulfation, by allowing amidosulfuric acid to react in the presence of an amide compound (exclusive of a sulfonic acid amide compound) or an amine compound at a temperature of preferably 60° C. or higher, more preferably 75° C. or higher, and still more preferably 90° C. or higher, and preferably 140° C. or lower, more preferably 135° C. or lower, and still more preferably 130° C. or lower, the double bond group is thoroughly protected, whereby a side reaction, such as isomerization of a terminal double bond group to an internal double bond group, sulfate group addition to the double bond group, etc., may be substantially completely prevented from occurring. According to this, a sulfuric acid ester salt of the terminal unsaturated compound with a high purity represented by the formula (1) may be produced.

Though the reaction time with amidosulfuric acid is not particularly limited, from the viewpoint of thoroughly advancing the sulfation, it is preferably 0.1 hours or more, more preferably 0.5 hours or more, and still more preferably 1 hour or more. In addition, from the viewpoint of suppressing the side reaction, the reaction time with amidosulfuric acid is preferably 50 hours or less, more preferably 20 hours or less, and still more preferably 10 hours or less.

Examples of the amide compound which is preferably used for the production method of the reactive anionic surfactant of the present invention may include urea; a urea derivative, such as methylurea, 1,1-dimethylurea, ethylurea, butylurea, acetylurea, etc.; and an acid amide compound, such as acetamide, formamide, propionamide, butylamide, diacetamide, succinic acid amide, etc.

In the present invention, examples of the amine compound which is preferably used for the production method of the reactive anionic surfactant represented by the formula (1) include morpholine, triethylamine, tributylamine, isopropylamine, diisopropylamine, and the like.

Among those, urea is preferred as the amide compound or amine compound which is used for the production method of the reactive anionic surfactant of the present invention.

As for the amide compound and the amine compound, each of which is preferably used for the production method of the reactive anionic surfactant of the present invention, in the case where the molecular weight is small, the effect is brought through use of a small amount, and the molecular weight is preferably 150 or less, and more preferably 100 or less.

From the viewpoint of suppressing the formation of a by-product, the use amount of the aforementioned amide compound or the aforementioned amine compound is preferably 0.5 mol % or more, more preferably 1 mol % or more, and still more preferably 3 mol % or more; and from the same viewpoint, 50 mol % or less, more preferably 30 mol % or less, and still more preferably 10 mol % or less, relative to the amidosulfuric acid.

Though a charge ratio (molar ratio) of amidosulfuric acid to the compound represented by the formula (4) is not particularly limited, from the viewpoint of increasing a degree of sulfation, it is preferably 1 time or more and 1.3 times or less, and more preferably 1 time or more and 1.1 times or less relative to the compound represented by the formula (4).

In sulfation with amidosulfuric acid, when moisture is incorporated into the raw materials, there is a concern that the moisture decomposes the amidosulfuric acid, thereby bringing a lowering of the degree of sulfation and an increase of the side reaction. Therefore, it is desired that the moisture contained in the compound represented by the formula (4) is removed as far as possible by a method, such as reduced pressure dehydration, etc., prior to the reaction.

From the viewpoints of antioxidation and color protection, it is preferred to perform the sulfation reaction with amidosulfuric acid in an atmosphere of an inert gas, such as a nitrogen gas, etc. The reaction temperature in the presence of the amide compound or amine compound is preferably 60° C. or higher, and more preferably 90° C. or higher, and preferably 140° C. or lower, and more preferably 130° C. or lower. After completion of the reaction, substances not dissolved in the reaction system, such as excessive amidosulfuric acid or amide compound, etc., may be removed through filtration.

While the sulfated product owing to amidosulfuric acid becomes an ammonium salt, it is also possible to replace the ammonium salt to other salt by a method, such as addition of a sodium hydroxide aqueous solution, etc., as the need arises.

[Production Method of Polymer Emulsion and Polymer Emulsion]

The production method of a polymer emulsion of the present invention is a method of subjecting a radical polymerizable monomer (hereinafter also referred to as "vinyl-based monomer") to emulsion polymerization with, as an emulsifier, the reactive surfactant composition of the present invention. In the production method of a polymer emulsion of the present invention, another anionic surfactant or a nonionic surfactant may also be used in combination as the emulsifier. It is preferred that such another anionic surfactant or nonionic surfactant is a reactive surfactant.

A proportion of the reactive surfactant of the present invention is preferably 50% by mass or more, more preferably 60% by mass or more, still more preferably 70% by mass or more, yet still more preferably 80% by mass or more, and most preferably 100% by mass relative to the total amount of the reactive surfactant composition.

In the emulsion polymerization according to the production method of a polymer emulsion of the present invention, from the viewpoints of dispersion stability and reactivity, the use amount of the reactive surfactant composition of the present invention is preferably 0.1% by mass or more, more preferably 0.5% by mass or more, and still more preferably 0.8% by mass or more relative to the total amount of the vinyl-based monomer. From the same viewpoint, the use amount of the reactive surfactant composition of the present invention is preferably 10% by mass or less, more preferably 8% by mass or less, and still more preferably 5% by mass or less relative to the total amount of the vinyl-based monomer.

Examples of the vinyl-based monomer which is used in the present invention include an aromatic vinyl monomer, a (meth)acrylic acid ester, (meth)acrylic acid, a vinyl halide and a vinylidene halide, a vinyl ester, a nitrile, and a conjugated diene. Specifically, examples of the aromatic vinyl monomer include styrene, α-methylstyrene, chlorostyrene, and the like; examples of the (meth)acrylic acid ester include methyl (meth)acrylate, butyl (meth)acrylate, 2-ethylhexyl (meth)acrylate, and the like; examples of the vinyl halide and the vinylidene halide include vinyl chloride, vinyl bromide, vinylidene chloride, and the like; examples of the vinyl ester include vinyl acetate, vinyl propionate, and the like; examples of the nitrile include (meth)acrylonitrile and the like; and examples of the conjugated diene include butadiene, isoprene, and the like. These monomers may be polymerized singly, or two or more thereof may be copolymerized.

The (meth)acrylic acid ester means a single kind or two kinds selected from a methacrylic acid ester and an acrylic acid ester. The (meth)acrylic acid means one or two selected from methacrylic acid and acrylic acid. Others expressed with the term "(meth)" are used in the same meanings.

The use amount of the vinyl monomer is preferably 30% by mass or more, and more preferably 40% by mass or more, and preferably 70% by mass or less, and more preferably 60% by mass or less, relative to the entire system of emulsion polymerization (all components inclusive of water).

Examples of a polymerization initiator which is used for the emulsion polymerization in the present invention include an inorganic peroxide, an organic peroxide, and an azo-based compound. Specifically, examples of the inorganic peroxide include potassium persulfate, ammonium persulfate, hydrogen peroxide, and the like; examples of the organic peroxide include t-butyl peroxide, cumene hydroperoxide, p-menthane hydroperoxide, and the like; and examples of the azo-based compound include azobisdiisobutyronitrile, 2,2'-azobis(2-amidinopropane) dihydrochloride, and the like. Among those, a water-soluble polymerization initiator is preferred, and a persulfate, such as potassium persulfate, ammonium persulfate, etc., is preferred.

Sodium hydrogen sulfite, ammonium ferrous sulfate, and so on may also be used as a polymerization promoter.

As an addition method of monomers, though a monomer dropping method, a monomer batch charging method, a pre-emulsion method, or the like may be adopted, from the viewpoint of micronizing the particle diameter at the time of emulsion polymerization, a pre-emulsion method is preferred.

A dropping time is preferably 1 hour or more, and more preferably 1.5 hours or more, and preferably 8 hours or less, and more preferably 5 hours or less.

A aging time is preferably 0.3 hours or more, and more preferably 0.5 hours or more, and preferably 5 hours or less, and more preferably 3 hours or less.

While a polymerization temperature is regulated owing to the decomposition temperature of the polymerization initiator, in the case of a persulfate, it is preferably 60° C. or higher, and more preferably 70° C. or higher, and preferably 90° C. or lower, and more preferably 80° C. or lower.

Though an average particle diameter of the polymer emulsion of the present invention which is obtained by the aforementioned method varies with an application, it is preferably 30 nm or more, and more preferably 80 nm or more, and preferably 500 nm or less, and more preferably 300 nm or less.

In the case of using the polymer emulsion as a coating material, from viewpoint of coating properties, a viscosity of the polymer emulsion of the present invention is preferably 10 mPa·s or more, and more preferably 50 mPa·s or more, and preferably 50,000 mPa·s or less, and more preferably 10,000 mPa·s or less.

Here, the average particle diameter and viscosity of the polymer emulsion are each a value measured by the method shown in the Examples as described later.

[Coating Material Composition and Polymer Coating Film]

A polymer coating film prepared from the polymer emulsion of the present invention is excellent in the water resistance and may be preferably used in the field of a coating material, particularly an aqueous coating material as well as in the field of a pressure sensitive adhesive product.

The preparation method of a polymer coating film of the present invention varies with an application. For example, in a pressure sensitive adhesive application, the polymer emulsion of the present invention having a low glass transition temperature (Tg) of a polymer of 2-ethylhexyl acrylate, n-butyl acrylate, etc. is produced through emulsion polymerization using the reactive surfactant composition of the present invention. When a material obtained by optionally blending a thickener, a tackifier, or the like in this polymer emulsion of the present invention is applied onto a base material, such as a paper, a film, etc., followed by hot-air drying to form a polymer coating film having a thickness of about 20 μm, a pressure sensitive adhesive product with excellent water resistance and pressure sensitive adhesive performance may be obtained.

In a coating material application, the polymer emulsion of the present invention, such as a n-butyl acrylate/methyl methacrylate copolymer, etc., is produced through emulsion polymerization using the reactive surfactant composition of the present invention. A coating material composition obtained by optionally blending a film-forming aid, a pigment, or the like in this polymer emulsion of the present invention is prepared. Though the polymer coating film of the present invention is not particularly limited so long as it is a polymer coating film formed of the aforementioned coating material composition, a coating film with excellent water resistance and weather resistance may be obtained by applying the coating material composition onto a building wall material or the like such that a dry film thickness is about 100 μm, followed by drying (e.g., natural drying, hot-air drying, etc.).

With respect to the aforementioned embodiments, the present invention further discloses the following reactive surfactant compositions for emulsion polymerization, production methods of a polymer emulsion, polymer emulsions, coating material compositions, polymer coating films, production methods of a reactive anionic surfactant, and uses of a reactive surfactant composition for emulsion polymerization.

<1> A reactive surfactant composition for emulsion polymerization containing a reactive anionic surfactant (component A) represented by the following formula (1), the component A being satisfied with the following requirement R.

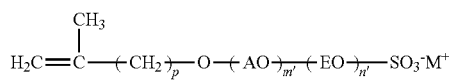

(1)

In the formula, AO represents an alkyleneoxy group having a carbon number of 3 or more and 18 or less; EO represents an ethyleneoxy group; p represents an integer of 1 or more and 15 or less; m' represents an integer of 0 or more; n' represents an integer of 0 or more; $M^+$ represents a hydrogen ion or a cation; and plural kinds of AOs may coexist.

Requirement R: An average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

X={(molar number of componentA-1)+(molar number of componentA-2)}÷(molar number of componentA)×100 (I)

<2> The reactive surfactant composition for emulsion polymerization as set forth in the above <1>, wherein in the formula (1), m' is an integer of 1 or more, preferably an integer of 2 or more, and more preferably an integer of 3 or more, and is an integer of 100 or less, preferably an integer of 50 or less, more preferably an integer of 30 or less, and still more preferably an integer of 15 or less.

<3> The reactive surfactant composition for emulsion polymerization as set forth in the above <1> or <2>, wherein in the formula (1), n' is an integer of 1 or more, preferably an integer of 2 or more, and more preferably an integer of 5 or more, and is an integer of 400 or less, preferably an integer of 200 or less, more preferably an integer of 100 or less, and still more preferably an integer of 50 or less.

<4> The reactive surfactant composition for emulsion polymerization as set forth in any of the above <1> to <3>, wherein in the formula (1), the carbon number of the alkyleneoxy group represented by AO is 12 or less, preferably 8 or less, more preferably 6 or less, and still more preferably 4.

<5> The reactive surfactant composition for emulsion polymerization as set forth in any of the above <1> to <4>, wherein in the formula (1), p is 10 or less, preferably 5 or less, more preferably 3 or less, and still more preferably 2.

<6> The reactive surfactant composition for emulsion polymerization as set forth in any of the above <1> to <5>, wherein in the requirement R, m is 2 or more, preferably 3 or more, and more preferably 4 or more, and is 20 or less, preferably 10 or less, and more preferably 8 or less.

<7> The reactive surfactant composition for emulsion polymerization as set forth in any of the above <1> to <6>, wherein in the requirement R, n is 1 or more, preferably 5 or more, more preferably 10 or more, and still more preferably 12 or more, and is 150 or less, preferably 50 or less, more preferably 25 or less, and still more preferably 18 or less.

<8> The reactive surfactant composition for emulsion polymerization as set forth in any of the above <1> to <7>, wherein in the requirement R, (m+n) is {3≤(m+n)≤100}, preferably {5≤(m+n)≤50}, more preferably {10≤(m+n)≤35}, still more preferably {15≤(m+n)≤30}, yet still more preferably {16≤(m+n)≤26}, and even yet still more preferably {18≤(m+n)≤25}.

<9> The reactive surfactant composition for emulsion polymerization as set forth in any of the above <1> to <8>, wherein in the formula (1), $M^+$ is at least one selected from the group consisting of a hydrogen ion, an alkali metal ion (for example, a sodium ion ($Na^+$) or a potassium ion ($K^+$)), an alkaline earth metal ion (for example, a calcium ion ($Ca^{2+}$) or a magnesium ion ($Mg^{2+}$)), an ammonium ion ($NH_4^+$), and an ammonium ion substituted with an alkyl group having a carbon number of 1 to 4, and preferably an ammonium ion.

<10> The reactive surfactant composition for emulsion polymerization as set forth in any one of the above <1> to <9>, wherein in the formula (I). X is 29 or less, preferably 28 or less, and more preferably 27 or less, and is 10 or more, preferably 15 or more, and more preferably 20 or more.

<11> A method of producing a polymer emulsion including subjecting a radical polymerizable monomer to emulsion polymerization in the presence of the reactive surfactant composition for emulsion polymerization as set forth in any one of the above <1> to <10>.

<12> The method of producing a polymer emulsion as set forth in the above <11>, wherein the use amount of the reactive surfactant composition for emulsion polymerization is 0.1% by mass or more, preferably 0.5% by mass or more, and more preferably 0.8% by mass or more, and is 10% by mass or less, preferably 8% by mass or less, and more preferably 5% by mass or less, relative to the total amount of the radical polymerizable monomer.

<13> A polymer emulsion obtained by the production method as set forth in the above <11> or <12>.

<14> The polymer emulsion as set forth in the above <13>, wherein an average particle diameter of the polymer emulsion is 30 nm or more, and preferably 80 nm or more, and is 500 nm or less, and preferably 300 nm or less.

<15> The polymer emulsion as set forth in the above <13> or <14>, wherein a viscosity of the polymer emulsion is 10 mPa·s or more, and preferably 50 mPa·s or more, and is 50,000 mPa·s or less, and preferably 10,000 mPa·s or less.

<16> A coating material composition containing the polymer emulsion as set forth in any one of the above <13> to <15>.

<17> A polymer coating film formed of the coating material composition as set forth in the above <16>.

<18> A method of producing a reactive anionic surfactant, including the following steps (i) to (iii), the reactive anionic surfactant being represented by the following formula (1) and being satisfied with the following requirement R (provided that in the requirement R, when n is 0, then the step (ii) is not performed):

Step (i): a step of adding an alkylene oxide having a carbon number of 3 or more and 18 or less to a compound represented by the following formula (2) in the presence of an aluminum-magnesium complex oxide catalyst to thereby obtain a compound represented by the following formula (3);

Step (ii): a step of adding ethylene oxide to the compound represented by the following formula (3) in the presence of an alkali catalyst to thereby obtain a compound represented by the following formula (4); and Step (iii): a step of sulfating the compound represented by the following formula (4) with a sulfating agent and neutralizing with a basic substance.

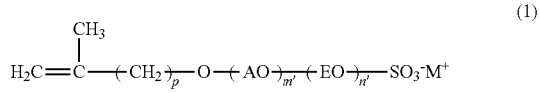
(1)

(2)

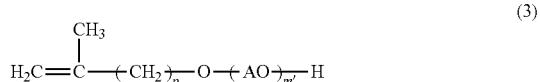
(3)

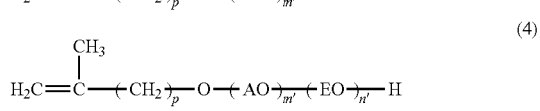
(4)

In the formulae (1) to (4), AO represents an alkyleneoxy group having a carbon number of 3 or more and 18 or less; EO represents an ethyleneoxy group; p represents an integer of 1 or more and 15 or less; m' represents an integer of 0 or more; n' represents an integer of 0 or more; M⁺ represents a hydrogen ion or a cation; and plural kinds of AOs may coexist.

Requirement R: an average addition molar number m of AO is a number of 1 or more and 60 or less; an average addition molar number n of EO is a number of 0 or more and 200 or less; and when in the compound represented by the formula (1) (component A), a component having an addition molar number of AO of (m–3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{(\text{molar number of component}A\text{-}1)+(\text{molar number of component}A\text{-}2)\}\div(\text{molar number of component}A)\times 100$ (I)

<19> The method of producing a reactive anionic surfactant as set forth in the above <18>, wherein the content of aluminum of the aluminum-magnesium complex oxide catalyst is 4% by mass or more, and preferably 10% by mass or more, and is 40% by mass or less, and preferably 25% by mass or less.

<20> The method of producing a reactive anionic surfactant as set forth in the above <18> or <19>, wherein the content of magnesium of the aluminum-magnesium complex oxide catalyst is 5% by mass or more, and preferably 10% by mass or more, and is 50% by mass or less, and preferably 40% by mass or less.

<21> The method of producing a reactive anionic surfactant as set forth in any of the above <18> to <20>, wherein a reaction temperature in the step (i) is 70° C. or higher, preferably 80° C. or higher, and more preferably 90° C. or higher, and is 200° C. or lower, preferably 150° C. or lower, and more preferably 130° C. or lower.

<22> The method of producing a reactive anionic surfactant as set forth in any of the above <18> to <21>, wherein in the step (i), the use amount of the aluminum-magnesium complex oxide catalyst is 0.05% by mass or more, preferably 0.1% by mass or more, more preferably 0.5% by mass or more, and still more preferably 1% by mass or more, and is 20% by mass or less, and preferably 10% by mass or less, relative to the compound represented by the formula (2).

<23> The method of producing a reactive anionic surfactant as set forth in any of the above <18> to <22>, wherein a pressure in the step (ii) is 0.1 MPa or more, and preferably 0.15 MPa or more, and is 3 MPa or less, and preferably 1 MPa or less.

<24> The method of producing a reactive anionic surfactant as set forth in any of the above <18> to <23>, wherein a reaction temperature in the step (ii) is room temperature or higher, preferably 60° C. or higher, and more preferably 100° C. or higher, and is 200° C. or lower, preferably 170° C. or lower, and more preferably 150° C. or lower.

<25> The method of producing a reactive anionic surfactant as set forth in any of the above <18> to <24>, wherein the sulfating agent is at least one selected from the group consisting of chlorosulfonic acid, sulfuric anhydride, and amidosulfuric acid, and is preferably amidosulfuric acid.

<26> The method of producing a reactive anionic surfactant as set forth in any of the above <18> to <25>, wherein the step (iii) is a step of sulfation with amidosulfuric acid in the presence of an amide compound (exclusive of a sulfonic acid amide compound) or an amine compound and neutralization with a basic substance; a reaction temperature of the sulfation is 60° C. or higher, preferably 75° C. or higher, and more preferably 90° C. or higher, and is 140° C. or lower, preferably 135° C. or lower, and more preferably 130° C. or lower; and a reaction time is 0.1 hours or more, preferably 0.5 hours or more, and more preferably 1 hour or more, and is 50 hours or less, preferably 20 hours or less, and more preferably 10 hours or less.

<27> Use of a reactive surfactant composition containing a reactive anionic surfactant (component A) represented by the following formula (1), the component A being satisfied with the following requirement R, for emulsion polymerization.

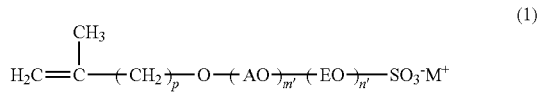

(1)

In the formula, AO represents an alkyleneoxy group having a carbon number of 3 or more and 18 or less; EO represents an ethyleneoxy group; p represents an integer of 1 or more and 15 or less; m' represents an integer of 0 or more; n' represents an integer of 0 or more; $M^+$ represents a hydrogen ion or a cation; and plural kinds of AOs may coexist.

Requirement R: An average addition molar number m of AO is a number of 1 or more and 50 or less; an average addition molar number n of EO is a number of 0 or more and 200 or less; and when in the component A, a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1).

$X=\{(\text{molar number of component} A\text{-}1)+(\text{molar number of component} A\text{-}2)\}\div(\text{molar number of component} A)\times100$ (I)

<28> The use of a reactive surfactant composition as set forth in the above <27>, wherein in the formula (1), m' is an integer of 1 or more, preferably an integer of 2 or more, and more preferably an integer of 3 or more, and is an integer of 100 or less, preferably an integer of 50 or less, more preferably an integer of 30 or less, and still more preferably an integer of 15 or less.

<29> The use of a reactive surfactant composition as set forth in the above <27> or <28>, wherein in the formula (1), n' is an integer of 1 or more, preferably an integer of 2 or more, and more preferably an integer of 5 or more, and is an integer of 400 or less, preferably an integer of 200 or less, more preferably an integer of 100 or less, and still more preferably an integer of 50 or less.

<30> The use of a reactive surfactant composition as set forth in any of the above <27> to <29>, wherein in the formula (1), the carbon number of the alkyleneoxy group represented by AO is 12 or less, preferably 8 or less, more preferably 6 or less, and still more preferably 4.

<31> The use of a reactive surfactant composition as set forth in any of the above <27> to <30>, wherein in the formula (1), p is 10 or less, preferably 5 or less, more preferably 3 or less, and still more preferably 2.

<32> The use of a reactive surfactant composition as set forth in any of the above <27> to <31>, wherein in the requirement R, m is 2 or more, preferably 3 or more, and more preferably 4 or more, and is 20 or less, preferably 10 or less, and more preferably 8 or less.

<33> The use of a reactive surfactant composition as set forth in any of the above <27> to <32>, wherein in the requirement R, n is 1 or more, preferably 5 or more, more preferably 10 or more, and still more preferably 12 or more, and is 150 or less, preferably 50 or less, more preferably 25 or less, and still more preferably 18 or less.

<34> The use of a reactive surfactant composition as set forth in any of the above <27> to <33>, wherein in the requirement R, (m+n) is $\{3 \leq (m+n) \leq 100\}$, preferably $\{5 \leq (m+n) \leq 50\}$, more preferably $\{10 \leq (m+n) \leq 35\}$, still more preferably $\{15 \leq (m+n) \leq 30\}$, yet still more preferably $\{16 \leq (m+n) \leq 26\}$, and even yet still more preferably $\{18 \leq (m+n) \leq 25\}$.

<35> The use of a reactive surfactant composition as set forth in any of the above <27> to <34>, wherein in the formula (1), $M^+$ is at least one selected from the group consisting of a hydrogen ion, an alkali metal ion (for example, a sodium ion ($Na^+$) or a potassium ion ($K^+$)), an alkaline earth metal ion (for example, a calcium ion ($Ca^{2+}$) or a magnesium ion ($Mg^{2+}$)), an ammonium ion ($NH_4^+$), and an ammonium ion substituted with an alkyl group having a carbon number of 1 to 4, and preferably an ammonium ion.

<36> The use of a reactive surfactant composition as set forth in any of the above <27> to <35>, wherein in the formula (I), X is 29 or less, preferably 28 or less, and more preferably 27 or less, and is 10 or more, preferably 15 or more, and more preferably 20 or more.

EXAMPLES

In the following Production Examples, Examples, and Comparative Examples, the terms "parts" and "%" are "parts by mass" and "% by mass", respectively unless specifically indicated.

[Measurement of Aluminum and Magnesium Contents in Al—Mg Complex Oxide Catalyst]

The contents of aluminum and magnesium in the Al—Mg complex oxide catalyst were measured in the following manner. First of all, 0.1 g of an Al—Mg complex oxide catalyst was precisely weighed in a quartz crucible and dissolved in 4 mL of 6N hydrochloric acid, followed by diluting with pure water in measuring flask to 50 mL. This was diluted 25 times with pure water, thereby preparing a measurement sample. A concentration of each of aluminum and magnesium ions in the measurement sample was measured with an atomic absorption photometer (Varian SpectrAA 220, manufactured by Agilent Technologies, Inc.). The concentration (% by mass) of an aluminum ion and the concentration (% by mass) of a magnesium ion were calculated, respectively and defined as the respective contents.

Production Example 1

In a 10-liter four-necked flask equipped with an agitator, a thermometer, a dropping funnel, and a reflux pipe, 860 g (10 mol) of 3-methyl-3-buten-1-ol and 34.4 g of an Al—Mg complex oxide catalyst ("KW-2000", aluminum content: 17.5% by mass, magnesium content: 35.4% by mass, manufactured by Kyowa Chemical Industry Co., Ltd.) were charged, and 4,320 g (60 mol) of butylene oxide (1,2-epoxybutane) was dropped in a nitrogen atmosphere at 110° C. over 13 hours, followed by aging at this temperature for 2 hours. To the resulting reaction product, a filter aid "Radiolite #900" (manufactured by Showa Chemical Industry Co., Ltd.) was added, and the catalyst was then removed by means of filtration, thereby obtaining a polybutyleneoxy alkenyl ether (compound represented by the formula (3)).

518 g (1 mol) of this polybutyleneoxy alkenyl ether and 15.6 g of potassium hydroxide were charged in a 2-liter autoclave, and 660 g (15 mol) of ethylene oxide was added under the conditions at 125° C. and 0.3 MPa. This reaction system was neutralized with acetic acid. Subsequently, 1,178 g (1 mol) of the resulting compound (polybutyleneoxy-polyethyleneoxy alkenyl ether which is a compound represented by the formula (4)), 97 g (1 mol) of amidosulfuric acid, and 3 g of urea were charged in a 2-liter four-necked flask equipped with an agitator and a thermometer and allowed to react with each other for sulfation in a nitrogen atmosphere at 125° C. for 4 hours. Thereafter, the unreacted amidosulfuric acid was removed by means of filtration under pressure, and the residue was neutralized with ammonia, thereby obtaining a reactive surfactant composition for emulsion polymerization [A-1] represented by the following formula. In the formula, m and n each represent an average addition molar number.

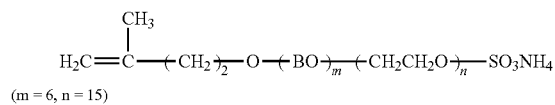

[A-1]

(m = 6, n = 15)

In the formula, BO represents a butyleneoxy group.

Production Examples 2 and 3

Reactive surfactant compositions for emulsion polymerization [A-2] and [A-3] were obtained in the same production method as in Production Example 1, except that the addition amount of the butylene oxide was changed to 3,600 g (50 mol) and 5,040 g (70 mol), respectively. In the formulae, m and n each represent an average addition molar number.

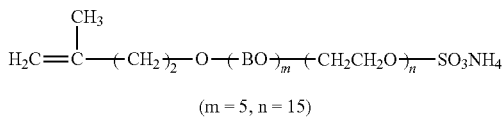

[A-2]

(m = 5, n = 15)

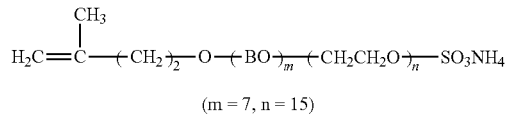

[A-3]

(m = 7, n = 15)

In the formulae, BO represents a butyleneoxy group.

Comparative Production Example 4

In a 1-liter four-necked flask equipped with an agitator, a thermometer, and a dropping funnel, 120.0 g (1.39 mol) of 3-methyl-3-buten-1-ol was charged and cooled to 10° C. in a nitrogen atmosphere; 3.96 g (0.028 mol) of a boron trifluoride diethyl ether complex (manufactured by Wako Chemical Industries, Ltd.) was added; 602 g (8.36 mol) of butylene oxide was dropped at 7 to 10° C.; and after dropping, the contents were aged at 10° C. for 1 hour. For the purpose of removing the boron trifluoride diethyl ether complex, 12.4 g of an adsorbing agent "KYOWAAD 500SH" (manufactured by Kyowa Chemical Industry Co., Ltd.) was added, and the contents were agitated at room temperature for 1 hour, followed by filtration under reduced pressure, thereby obtaining a polyoxybutylene alkenyl ether.

518 g (1 mol) of this polyoxybutylene alkenyl ether and 15.5 g of potassium hydroxide were charged in a 2-liter autoclave, and 660 g (15 mol) of ethylene oxide was added under the conditions at 125° C. and 0.3 MPa. This reaction system was neutralized with acetic acid. Subsequently, 1,178 g (1 mol) of the resulting compound (polyoxybutylene-polyoxyethylene alkenyl ether), 97 g (1 moo of amidosulfuric acid, and 3 g of urea were charged in a 2-liter four-necked flask equipped with an agitator and a thermometer and allowed to react with each other for sulfation in a nitrogen atmosphere at 125° C. for 4 hours. Thereafter, the unreacted amidosulfuric acid was removed by means of filtration under pressure, and the residue was neutralized with ammonia, thereby obtaining a reactive surfactant composition for emulsion polymerization [B-1] represented by the following formula. In the formula, m and n each represent an average addition molar number.

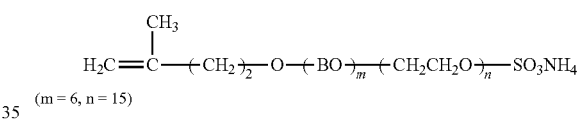

[B-1]

(m = 6, n = 15)

In the formula, BO represents a butyleneoxy group.

<Measurement Method of X of the Formula (I)>

The addition molar number of each alkylene oxide of the compound represented by the formula (3) was calculated from an area ratio of peaks of the chromatogram obtained under the following conditions. A chromatogram chart of the compound (polybutyleneoxy alkenyl ether) represented by the formula (3) as produced in Production Example 1 is shown in the FIGURE. In the FIGURE, the peak of 7.732 minutes is a peak of a 3-mol adduct of the butyleneoxy group; the peak of 11.459 minutes is a peak of a 4-mol adduct; and the followings are each a peak of the compound in which the addition number of the butyleneoxy group increases with every 1 mol. The retention time, the addition molar number of the butyleneoxy group, and the peak area are shown in Table 1.

With respect to Production Examples 2 and 3 and Comparative Production Example 4, the same measurement was also performed to calculate X of the formula (I). The results are shown in Table 2.

Measuring instrument: Agilent 6890N (gas chromatograph, manufactured by Agilent Technologies, Inc.)
Column: DB-1ht (manufactured by Agilent Technologies, Inc.) (length: 30 m, inside diameter: 0.25 mm, film thickness: 0.10 μm)
Carrier gas: He (constant flow mode)
Split ratio: 50/1
Detector: FID
Injection port temperature: 330° C.
Detector temperature: 330° C.

Measurement temperature conditions: 100° C.→temperature rise at 10° C./min→holding at 380° C. for 27 minutes
Detection sensitivity:
Uptake rate: 20 Hz
Minimum peak width: 0.01 min
Injection amount: 1 μL (split method)

TABLE 1

| No. | Retention time | Addition molar number of butyleneoxy group | Area % |
|---|---|---|---|
| 1 | 7.732 | 3 | 3.64 |
| 2 | 11.459 | 4 | 17.05 |
| 3 | 14.528 | 5 | 24.08 |
| 4 | 17.122 | 6 | 21.32 |
| 5 | 19.384 | 7 | 14.72 |
| 6 | 21.381 | 8 | 9.00 |
| 7 | 23.100 | 9 | 5.18 |
| 8 | 24.749 | 10 | 3.08 |
| 9 | 26.416 | 11 | 1.92 |

TABLE 2

| | Mol % of component A-1 | Mol % of component A-2 | X of formula (I) |
|---|---|---|---|
| [A-1] | 3.6 | 19.2 | 22.8 |
| [A-2] | 0.2 | 24.0 | 24.2 |
| [A-3] | 7.1 | 18.6 | 25.7 |
| [B-1] | 6.9 | 28.6 | 35.5 |

<Measurement Method of Average Addition Molar Number>

The average addition molar numbers m and n of the alkyleneoxy group and the ethyleneoxy group of the reactive anionic surfactant were calculated according to the following hydroxyl value.

Measurement of Hydroxyl Value

The hydroxyl value was measured according to the method described in "JIS K0070-1992 7.1: Neutralization titration method". An acid value to be used for calculation of the hydroxyl value was measured according to the method described in "JIS K0070-1992 3.1: Neutralization titration method". Here, in order to perform the analysis with a higher precision, the measurement method using a synthetic intermediate is shown; however, it is also possible to directly measure the reactive surfactant composition by general liquid chromatography.

m and n are determined from the measured hydroxyl value according to the following formulae.

$$m = (M_a \div OHV_1 \times 1{,}000 - M_b) \div M_c$$

$$n = (M_a \div OHV_2 - M_a \div OHV_1) \div M_d \times 1{,}000$$

$OHV_1$: Hydroxyl value of the compound represented by the formula (3) (mgKOH/g)
$OHV_2$: Hydroxyl value of the compound represented by the formula (4) (mgKOH/g)
$M_a$: Molecular weight of potassium hydroxide
$M_b$: Molecular weight of the compound represented by the formula (2)
$M_c$: Molecular weight of the alkyleneoxy group (AO)
$M_d$: Molecular weight of the ethyleneoxy group (EO)

Examples 1 to 5 and Comparative Examples 1 to 3

Using each of the reactive surfactant compositions obtained in Production Examples 1 to 4 as an emulsifier for emulsion polymerization, the emulsion polymerization was performed by the following method, and the performance was evaluated by the following method. The results are shown in Table 3.

Emulsion Polymerization Method

Example 1

In a 1-liter three-necked flask equipped with an agitator and a raw material input port, 112.5 g of ion-exchange water, 0.36 g of potassium persulfate as a polymerization initiator, and 1.80 g of the reactive surfactant composition [A-1] were mixed, to which was then dropped a monomer mixture of 109.7 g of butyl acrylate, 109.7 g of styrene, and 5.6 g of acrylic acid over about 5 minutes while agitating at a rate of 500 r/min, and the contents were agitated for 30 minutes, thereby obtaining an emulsion for dropping.

Subsequently, in a 1-liter separable flask equipped with an agitator, a reflux condenser, and a raw material input port, 162.5 g of ion-exchange water, 0.09 g of potassium persulfate as a polymerization initiator, 0.45 g of the reactive surfactant composition (A-1, and 17.1 g (corresponding to 5% by mass) of the aforementioned emulsion for dropping were charged, the temperature was raised to 80° C., and first-stage polymerization was performed for 30 minutes. Thereafter, the remaining emulsion for dropping was dropped over 3 hours, and after completion of dropping, the contents were aged at 80° C. for 1 hour. The resulting polymer emulsion was cooled to 30° C.

Examples 2 to 5 and Comparative Examples 1 to 3:

Examples 2 to 5 and Comparative Examples 1 to 3 were each performed in the kind and addition amount of the reactive surfactant composition as shown in Table 3 in accordance with the aforementioned method.

<Performance Evaluation Method>

(1) Average Particle Diameter

Using a submicron particle-size distribution measuring device "Coulter N4 Plus" (manufactured by Beckman Coulter, Inc.), polymer emulsion particles which had been neutralized with 25% ammonia water were diluted thirty thousand times and measured for an average particle diameter. As the measurement analysis method, a unimodal mode was adopted.

(2) Viscosity

Using a BII viscometer (manufactured by Toki Sangyo Co., Ltd.), a viscosity of the polymer emulsion which had been neutralized with 25% ammonia water was measured at 25° C. and a rotation frequency of 12 r/min.

(3) Water Resistance of Polymer Film

Using a Baker type film applicator No. 510 (0 to 50 mil) (manufactured by Yasuda Seiki Seisakusho, Ltd.), the polymer emulsion which had been neutralized with 25% ammonia water was applied on a transparent acrylic resin plate such that a dry film thickness was 50 μm, and then dried at 100° C. for 10 minutes by using an air-forced oven SPS-222 (manufactured by ESPEC Corp.). This acrylic resin plate was dipped in warm water at 60° C. for 16 hours and then dried, and a haze value of the polymer film was measured using a haze-transmittance meter HM-150 (manufactured by Murakami Color Research Laboratory Co., Ltd.). The smaller the haze value, the more favorable water resistance, and it is judged that in the case where the haze value is 15% or less, the water resistance is especially favorable.

TABLE 3

| | | Reactive surfactant composition | | | | | | | | | |
|---|---|---|---|---|---|---|---|---|---|---|---|
| | | Kind | p | m | n | X | Addition amount (g) in emulsion dropping liquid | Addition amount (g) at the time of start of emulsion polymerization | Total addition amount (g) | Average particle diameter (nm) | Viscosity (mPa·s) | Water resistance of polymer film (haze value, %) |
| Example | 1 | A-1 | 2 | 6 | 15 | 22.8 | 1.80 | 0.45 | 2.25 | 155 | 86 | 8 |
| | 2 | A-1 | 2 | 6 | 15 | 22.8 | 3.60 | 0.90 | 4.50 | 141 | 121 | 13 |
| | 3 | A-1 | 2 | 6 | 15 | 22.8 | 5.44 | 1.36 | 6.80 | 122 | 250 | 22 |
| | 4 | A-2 | 2 | 5 | 15 | 24.2 | 5.44 | 1.36 | 6.80 | 141 | 272 | 25 |
| | 5 | A-3 | 2 | 7 | 15 | 25.7 | 5.44 | 1.36 | 6.80 | 133 | 1,300 | 27 |
| Comparative Example | 1 | B-1 | 2 | 6 | 15 | 35.5 | 1.80 | 0.45 | 2.25 | 185 | 91 | 17 |
| | 2 | B-1 | 2 | 6 | 15 | 35.5 | 3.60 | 0.90 | 4.50 | 158 | 180 | 20 |
| | 3 | B-1 | 2 | 6 | 15 | 35.5 | 5.44 | 1.36 | 6.80 | 137 | 515 | 29 |

It has been noted from Table 3 that by using the reactive surfactant composition of the present invention, the polymer emulsion having a small particle diameter is obtained; and that the amount of the reactive surfactant composition to be used can be reduced. Furthermore, it has become clear that the polymer film produced using the obtained polymer emulsion is excellent in the water resistance. On the other hand, in Comparative Examples 1 to 3, in the case of using the reactive surfactant composition in the same amount as in the Examples, it has become clear that the particle diameter of the obtained polymer emulsion is larger; and that the polymer film produced using the obtained polymer emulsion is inferior in the water resistance.

INDUSTRIAL APPLICABILITY

By using the reactive surfactant composition for emulsion polymerization of the present invention, it is possible to micronize the particle diameter of the obtained polymer emulsion, and the addition amount of the reactive surfactant composition to be used can be reduced. In addition, the polymer coating film prepared from the polymer emulsion of the present invention is excellent in the water resistance and can be preferably used in the field of a coating material, particularly an aqueous coating material as well as in the field of a pressure sensitive adhesive product.

The invention claimed is:

1. A method of producing a reactive anionic surfactant, comprising the following steps (i) to (iii), the reactive anionic surfactant being represented by the following formula (1) and being satisfied with the following requirement R (provided that in the requirement R, when n is 0, then the step (ii) is not performed):

Step (i): a step of adding an alkylene oxide having a carbon number of 4 or more and 18 or less to a compound represented by the following formula (2) in the presence of an aluminum-magnesium complex oxide catalyst to thereby obtain a compound represented by the following formula (3);

Step (ii): a step of adding ethylene oxide to the compound represented by the following formula (3) in the presence of an alkali catalyst to thereby obtain a compound represented by the following formula (4); and Step (iii): a step of sulfating the compound represented by the following formula (4) with a sulfating agent and neutralizing with a basic substance:

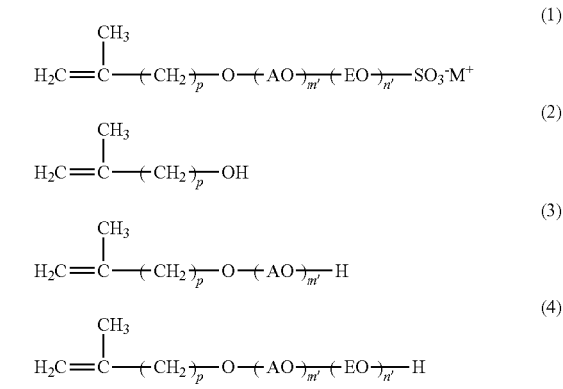

wherein AO represents an alkyleneoxy group having a carbon number of 4 or more and 18 or less; EO represents an ethyleneoxy group; p represents an integer of 1 or more and 15 or less; m' represents an integer of 0 or more; n' represents an integer of 0 or more; M+ represents a hydrogen ion or a cation; and plural kinds of AOs may coexist: and Requirement R: an average addition molar number m of AO is a number of 1 or more and 50 or less; an average addition molar number n of EO is a number of 0 or more and 200 or less; and when in the compound represented by the formula (1) (component A), a component having an addition molar number of AO of (m−3) or less is defined as (component A-1), and a component having an addition molar number of AO of (m+2) or more is defined as (component A-2), X in the following formula (I) is less than 30, provided that when m is less than 3, (m'=0) is defined as (component A-1):

$X=\{$(molar number of component $A$-1)+(molar number of component $A$-2)$\}\div$(molar number of component $A$)×100  (I).

2. The method of producing a reactive anionic surfactant according to claim 1, wherein in the formula (1), m' is an integer of 1 or more and an integer of 100 or less.

3. The method of producing a reactive anionic surfactant according to claim 1, wherein in the formula (1), m' is an integer of 2 or more and an integer of 50 or less.

4. The method of producing a reactive anionic surfactant according to claim 1, wherein in the formula (1), n' is an integer of 1 or more and an integer of 400 or less.

5. The method of producing a reactive anionic surfactant according to claim 1, wherein in the formula (1), n' is an integer of 2 or more and an integer of 200 or less.

6. The method of producing a reactive anionic surfactant according to claim 1, wherein in the formula (1), the carbon number of the alkyleneoxy group represented by AO is 8 or less.

7. The method of producing a reactive anionic surfactant according to claim 1, wherein in the requirement R, m is 2 or more and 20 or less.

8. The method of producing a reactive anionic surfactant according to claim 1, wherein in the requirement R, m is 3 or more and 10 or less.

9. The method of producing a reactive anionic surfactant according to claim 1, wherein in the requirement R, n is 1 or more and 150 or less.

10. The method of producing a reactive anionic surfactant according to claim 1, wherein in the requirement R, (m+n) is $\{3 \leq (m+n) \leq 100\}$.

11. The method of producing a reactive anionic surfactant according to claim 1, wherein in the formula (1), X is 10 or more and 29 or less.

12. The method of producing a reactive anionic surfactant according to claim 1, wherein a reaction temperature in Step (i) is 70° C. or higher and 150° C. or lower.

13. The method of producing a reactive anionic surfactant according to claim 1, wherein the use amount of the catalyst in Step (i) is 0.05% by mass or more and 20% by mass or less relative to the compound represented by the formula (2).

14. The method of producing a reactive anionic surfactant according to claim 1, wherein the compound represented by the formula (2) is 3-methyl-3-buten-1-ol.

15. The method of producing a reactive anionic surfactant according to claim 1, wherein after Step (i), there is a step in which the reaction product is cooled, and water or a filter aid for the purpose of reducing the viscosity is added, followed by filtration of the catalyst.

16. The method of producing a reactive anionic surfactant according to claim 1, wherein in Step (ii) the pressure is 0.1 MPa or more and 3 MPa or less, and the reaction temperature is 60° C. or higher and 200° C. or lower.

17. The method of producing a reactive anionic surfactant according to claim 1, wherein in Step (iii) the compound represented by the formula (4) is sulfated with a sulfating agent in the presence of an amide compound (exclusive of a sulfonic acid amide compound) or an amine compound at the temperature of 60° C. or higher and 140° C. or lower.

18. The method of producing a reactive anionic surfactant according to claim 1, wherein in Step (iii) the sulfating agent is amidosulfuric acid.

19. A method of producing a polymer emulsion, comprising subjecting a radical polymerizable monomer to emulsion polymerization in the presence of the reactive anionic surfactant obtained by the method according to claim 1.

20. The method of producing a polymer emulsion according to claim 19, wherein the use amount of the reactive anionic surfactant is 0.1% by mass or more and 10% by mass or less relative to the total amount of the radical polymerizable monomer.

* * * * *